United States Patent
Nyunoya

[15] 3,706,360
[45] Dec. 19, 1972

[54] AUTOMATIC BRAKE ADJUSTER

[72] Inventor: Mizuo Nyunoya, Kariya, Japan

[73] Assignee: Aisin Seiki Kabushiki Kaisha, Kariya, Aichi pref., Japan

[22] Filed: Dec. 28, 1970

[21] Appl. No.: 101,666

[30] Foreign Application Priority Data

Dec. 25, 1969 Japan..................................45/306

[52] U.S. Cl......188/79.5 P, 188/106 A, 188/196 BA
[51] Int. Cl.............................................F16d 51/50
[58] Field of Search............188/79.5, 106 A, 196 BA

[56] References Cited

UNITED STATES PATENTS 2,292,017   8/1942   Smith..............................188/79.5 B
3,583,532   6/1971   Hodkinson....................188/106 A X Primary Examiner—Duane A. Reger
Attorney—Sughrue, Rothwell, Mion, Zinn & Macpeak

[57] ABSTRACT

This invention relates generally to improvements in and relating to a hydraulic brake control apparatus in an automotive vehicle. More specifically, it relates to an apparatus for automatic brake gap control in a shoe-drum brake unit for an automotive hydraulic brake system comprising a hydraulic service brake system and a manual parking brake system.

The improvements resides in the provision of such means that during actuation of the hydraulically operated service brake, a ratchet type brake gap-adjuster is disabled from operation, and during actuation of the manually operated parking brake, the adjuster is released to its ready-for-operational position.

10 Claims, 4 Drawing Figures

INVENTOR
MIZUO NYUNOYA
BY Sughrue, Rothwell, Mion, Zinn & Macpeak
ATTORNEYS

AUTOMATIC BRAKE ADJUSTER

This invention relates generally to improvements in and relating to a hydraulic brake control method in an automotive vehicle, and an apparatus adapted for carrying out such method. More specifically, it relates to a method for automatic brake gap control in a shoe-drum brake unit for an automotive hydraulic brake system comprising a hydraulic service brake system and a manual parking brake system.

There are several types of this kind of automatic brake gap adjuster. As a first example, the gap adjusting function is brought about only upon actuation of the hydraulically operating service brake system. As a second example, the gap correcting function is brought about when the manual parking brake has been actuated. As a third example of the conventional automatic brake gap adjuster, the gap correction is carried out decreasing simultaneous application of the both brake systems.

In all of these conventional brake gap automatic adjusters, it is frequently encountered that upon simultaneous application of the both brake systems, a brake cylinder distorsion or deformation which may appear upon sudden, substantial and/or prolonged application of the brake, can be introduced into the corrective operation of the brake, and on account of the fact that the shoes have been expandedly applied to the drum against the action of shoe-return springs and reaction from the side of the brake drum cannot be transmitted reversedly through the applied shoes to the gap adjusting mechanism. This conventional drawback invited frequently the phenomenon of brake shoe slipping. Since the brake system of the aforementioned structure is utilized frequently and most advantageously for automotive rear wheels, and both the service brake and the parking brake are simultaneously applied rather frequently in case of vehicle parking service, especially when halting the vehicle on a steeply inclined traffic surface. In this case, thermal and/or mechanical drum deformation or distorsion may be introduced disadvantageously in the gap-correcting operation of the adjuster above referred to.

The main object of the invention is to provide a method for effective removal of the aforementioned conventional drawback as wet frequently in case of the automatic brake-gap correction service.

A further object is to provide an apparatus adapted for effective realization of the said main purpose of the invention, and indeed, in a highly efficient manner with a highly simplified mechanism.

These and further objects, features and advantageous of the invention will become more apparent when read the following detailed description of the invention by reference to the accompanying drawings illustrative of two preferred embodiments of the invention only by way of example.

Figure 1:
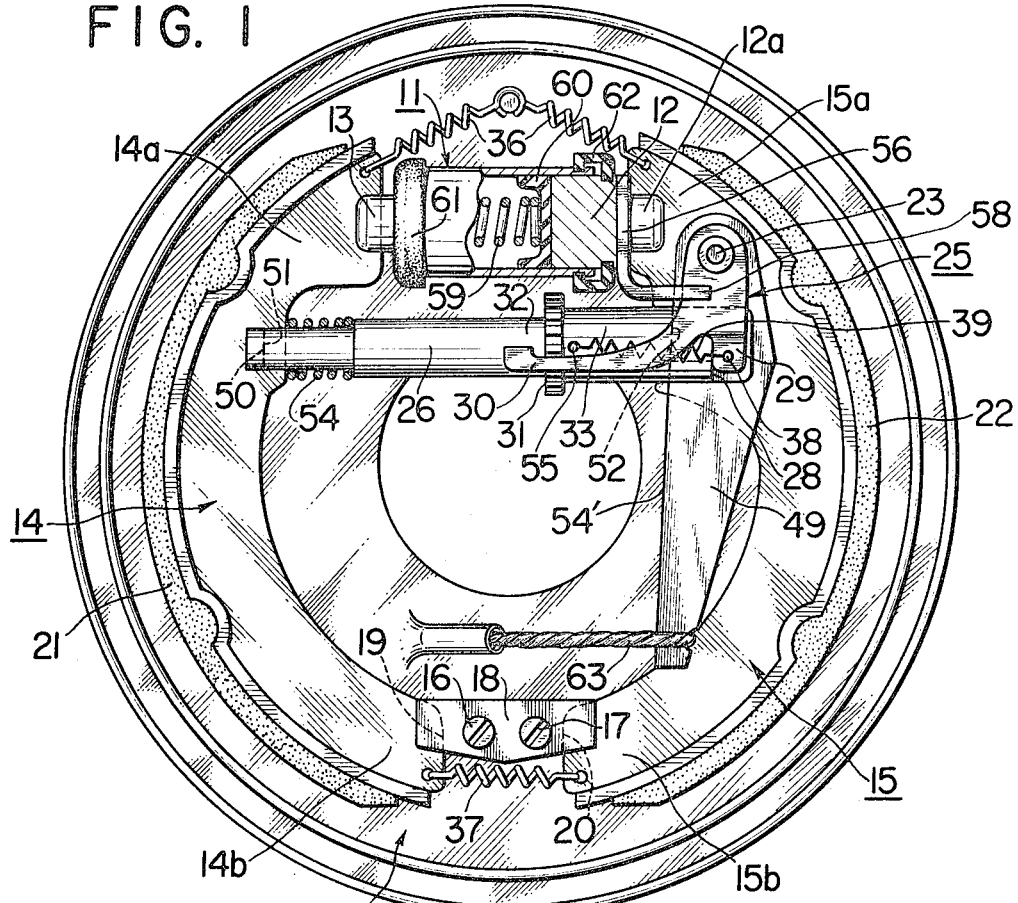
FIG. 1 is a front view of a first embodiment of the apparatus adapted for carrying out the method according to this invention.
Figure 2:
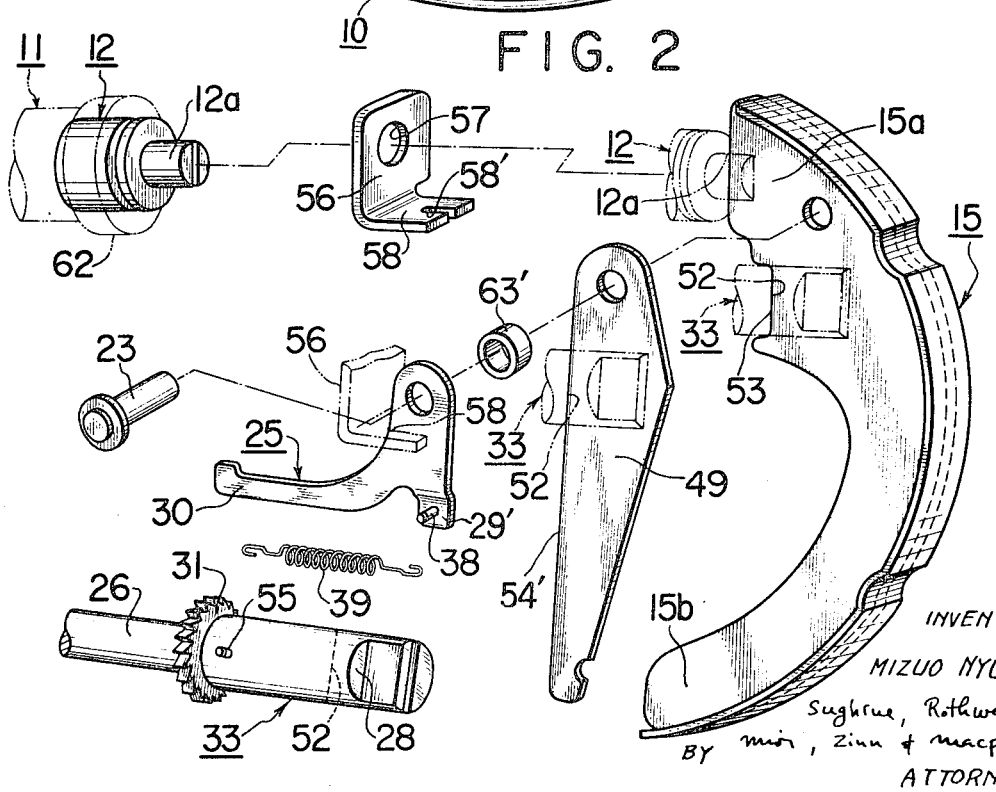
FIG. 2 is an exploded perspective detail view of several working parts of the apparatus shown in FIG. 1.

Referring now to FIGS. 1 and 2, a first embodiment of the present invention will be described hereinbelow in detail.

Numeral 10 represents a conventional stationary back plate which is fixedly attached to the axle casing for an automotive wheel to which brake is to be applied, by means of screws or the like conventional fixing means, although not specifically shown on account of its very popularity. In the upper area of the back plate 10, a wheel brake cylinder is fixedly mounted as conventionally, said cylinder being provided with a pair of working pistons 12 and 13 arranged to hydraulically expand for exerting braking effort on a conventional brake drum, not to shown. As will be well supposed from FIG. 1, each outer end of these pistons 12 and 13 is formed with a U-shaped groove which is kept in pressure contact with a conventional brake shoe 14 or 15 by its upper end 14a or 15a. On the other hand, the lower ends 14b and 15b of these brake shoes 14 and 15 are normally kept in pressure contact with respective grooves 19 and 20 formed on the both ends of a stationary anchor 18. The brake shoes 14 and 15 are fitted with respective brake or friction elements 21 and 22, respectively, by conventional fixing means such as glueing, rivetting or screw means or the like.

On the upper end 15a of shoe 15, ends of parking lever 49 and adjusting lever 25 are pivotably mounted through a spacer member 54'. The opposite end 29 of said lever 25 is kept in pressure contact with a left-hand side shoulder 28 formed on a lateral stringer member 26 which is arranged between the shoes 14 and 15 and in parallel to said wheel cylinder 11. The opposite end 30 of said lever 25 is formed into an elastic part and kept in driving engagement with the outer peripheral teeth on ratchet wheel 31 on said stringer member 26. This ratchet wheel 31 is adapted for being driven by the lever 25, when the latter swivels a certain predetermined angle or more.

The stringer member 26 comprises a main body 33 having male threads 32 in mesh with corresponding female threads in the wheel 31, so as to be capable of performing relative axial movement when the wheel is rotatingly driven as will be more fully described hereinbelow. The left-hand end of the stringer member 26 is formed with a U-groove 50 which is kept in pressure contact with a U-groove 51 formed on the upper end 14a of shoe 14, so as to provide a kind of fork joint or a cross-joint so called therebetween. A U-groove 52 is formed on the right-hand end of the stringer and kept in pressure engagement with a U-groove 53 on the upper end 15a of shoe 15, and, at the same time, with a face 54' formed on a parking lever 49.

A spring 54 is tensioned between shoe 14 and stringer 26, servicing as a kind of gap compensator between these members 14 and 26, when the service brake is brought into actuation thereby otherwise possible vibration and oscillation being suppressed to a possible minimum.

A pin 38 projects from one end 29 of adjusting lever 25. A further pin 55 is mounted rigidly on said main body 33. A spring 39 is tensioned between these pins 38 and 55. Piston 12 is formed with a head 12a which mounts an engaging lever 56 by a ring opening 57, the left-hand end of the lever being kept in pressure contact with the piston 12 per se and the right-hand end of the same lever being kept in pressure engagement with the upper end 14a of the right-hand brake shoe 14. Lever 56 is formed with a U-recess 58' which is kept in engagement with the adjusting lever 25. A spring 59 is tensioned between the pistons 12 and 13. 60 denotes a piston cup made of a resilient material and kept in cooperational relationship with piston 12.

Dust covers 61 and 62 made of pliable material such synthetic rubber are bridgingly covering the respective gaps between the respective piston and the cylinder.

Springs 36 and 37 are back- or shoe return springs tensioned between the brake shoes 14 and 15. Numeral 63 represents a pull wire extending from one end of adjusting lever 49 to a conventional parking brake lever, not shown, to be manipulated by the vehicle driver.

Although the both pistons are arranged movable relative to the backing plate 10 in the first embodiment so far shown and described, one of these pistons can be arranged rigid with the plate 10 and the cylinder may be, in this case, axially slidably mounted on the same plate 10, without injuring the gist and nature of the invention.

The tension of spring 39 is so selected and adjusted that it can overcome the rotational resistance at the adjusting ratchet wheel 31 provided by the back spring 36.

The operation of the foregoing first embodiment is as follows:

Now assuming that the vehicle is running and the service brake is being applied by depressing the conventional foot-operated brake pedal, not shown.

Pressure liquid will be, therefore, conveyed from a conventional master cylinder, not shown, to the cylinder space defined between the both hydraulic pistons 12 and 13 through a piping communicating between the master cylinder and a certain communication port, not shown, formed in the wall of said cylinder, as is well known per se. Thus, the pistons 12 and 13 are caused hydraulically to expand from each other and the brake shoes 14 and 15 are brought into contact with the inside wall surface of the brake drum, not shown, through their friction elements 21 and 22, so as to provide a kind of the leading-trailing brake mode.

During this brake shoe-applying stroke, the shoe 15 will perform a partial clockwise rotation in FIG. 1 around the anchor 18 as its pivoting center. Therefore, the adjusting lever 25 would perform a clockwise rotation about its pivot 23. But, in this case, by the unitary shoe-expanding movement of the piston 12, the engaging lever 56 and the upper shoe end 15a, the mutual engaging position between the fork end 58 of lever 56 and the adjusting lever 25 will cause only to expand the spring 39 to a certain degree and the expected rotation of the lever 25 can not be brought about in practice.

Therefore, it will be seen that even if the brake gap between the shoe 14 or 15 and the brake drum should be in excess of a predetermined operational value, any rotation of the gap-adjusting ratchet wheel 31 is not invited in any way.

When the vehicle driver pulls the parking brake lever, pulling force is applied to the cable or wire 63 which is thus pulled in the left-hand direction in FIG. 1, and the parking lever 49 is swivelled clockwise about its pivot pin 23 as its center. Therefore, the stringer member 26 is pulled forcibly towards left against the action of back spring 36, thereby the upper end 14a of shoe 14 being subjected to a left-hand expansion force. The reaction force thus invited will act upon the upper end 15a of the opposite shoe 15 which is thus caused to expand rightwards. Therefore, the service brake application will be performed in the same braking mode as with the service brake application described hereinbefore.

Since, in this parking brake application stroke, the upper end of lever 25 is pulled rightwards by the shoe 15 and the opposite or lower end of the same lever is pulled, on the contrary, leftwards under the influence of spring 39, the lever 25 will be rotated clockwise about the pivot pin 70, if the brake gap between the related shoe and the brake drum exceeds the predetermined value, thereby the wheel 31 being rotated by the spring action 36, so as to adjust the brake gaps between the shoes 14; 15 and the drum. When these brake gaps are maintained below the prescribed values, the adjusting lever 25 does not rotate the ratchet wheel 31 in any way.

Even when the adjusting lever 25 should be brought into unintentional engagement with the stopper or engageable lever 56, piston 12 can be pushed back by the spring action 59 towards left in FIG. 1.

In the case of parking brake application and the reaction force transmitted reversedly from the side of the brake drum to such a degree that the stringer member 26 is acted upon thereby, the screwed shifting mechanism serving for the gap adjusting purpose will be subjected to a correspondingly increased rotational resistance, thus any rotation of the gap-adjusting ratchet wheel being invited, resulting, therefore, into a further escaping elongation of spring 39. Therefore, any unintentional and overdue gap-correcting operation caused by occasional thermal and/or mechanical distortion of the brake drum invited by a prolonged brake application or the like cause, can be avoided from its introduction into the intended regular and automatic brake gap-adjustment.

When it is assumed further that the service brake has been applied beforehand and the parking brake is additionally applied, or the both brakes have been applied simultaneously, the expanded position of the both brake shoes will prevent rotation of the adjusting lever 25 by virtue of the engagement thereof with the stopper lever 56. In this position, therefore, an actuation of parking lever 49 will only cause the stringer 26 and lever 25 to perform a mutual separation through the spring 39. It is practically difficult, therefore, to rotate the lever 25, thus the gap-adjusting wheel 31 being unable to be rotated.

It will thus be seen from the foregoing that the occasionally appearing drum deformation or distortion cannot be introduced into the brake-gap adjusting operation which can be brought about only in the case of parking brake application. Thus, the automatic brake gap-adjusting procedure can be performed in an accurate and effective manner, so as to maintain the prescribed value.

Figure 3:
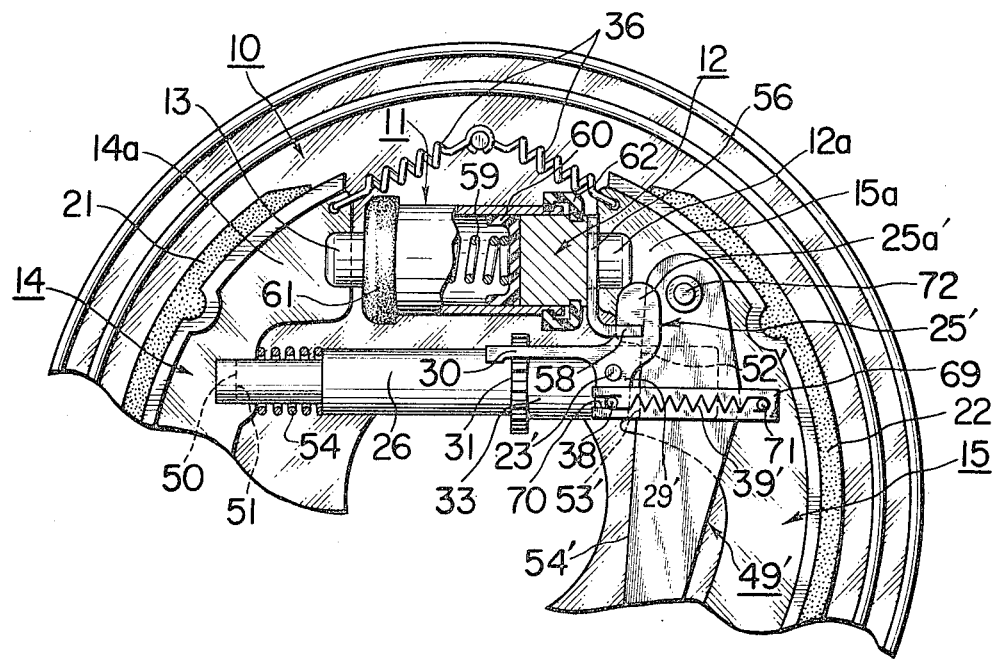
FIG. 3 is a similar view to FIG. 1, illustrative of a second embodiment of the apparatus for carrying out of the method according to this invention.
Figure 4:
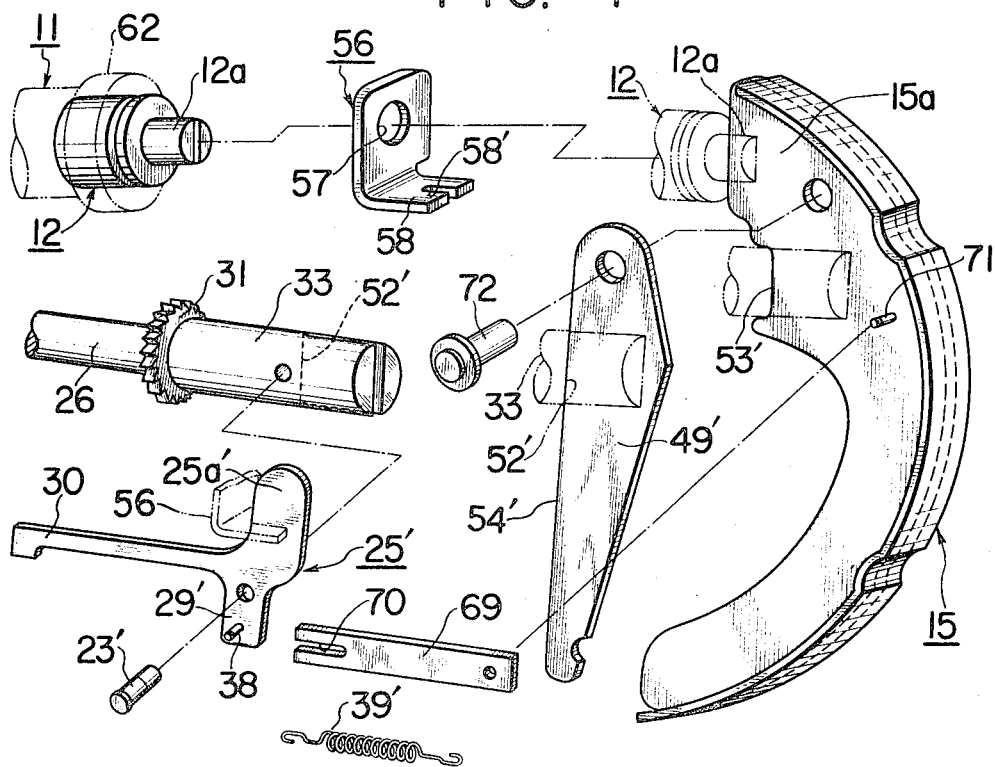
FIG. 4 is a similar view to FIG. 2 concerning the apparatus shown in FIG. 3.

Next referring to FIGS. 3 and 4, a second preferred embodiment of the invention will be described in detail hereinbelow.

In the present embodiments, main constituents thereof are substantially similar in their design and arrangement as before, irrespective of minor constructional features, so that they have been illustrated with respective same reference numerals as in the foregoing embodiment only for easier comparison and better understanding of the invention.

In the present embodiment, the adjusting lever shown at 25' is pivotably mounted on the main body 33 by a pivot pin 23'. The upper end 25a' of said lever 25' is kept in operative engagement with the U-groove or recess 58' formed on the engageable or stopper lever 56 which is substantially same as that employed in the foregoing first embodiment, while the lower end 29' thereof is provided with a projecting pin 38 kept in engagement with a U-groove or recess 70 formed on the left-hand end of motion-transmission lever 69, said pin 38 being kept also in engagement with the hooked end of spring 39'. The opposite or right-hand end of said transmission lever 69 is pivotably mounted on the shoe 15 by means of a pin 71 which receives additionally another hooked end of said spring 39'. The upper end 49' of said adjusting lever is pivotably mounted on the upper end 15a of the shoe 15 by means of a pin 70. The lever 49', and the U-recess 53' on the upper end 15a of shoe 15 are kept in engagement with a U-recess 52' formed on the right-hand end of said stringer member 26.

The operation of the second embodiment is as follows:

When the vehicle driver depresses the brake pedal in case of travelling of the vehicle, hydraulic pressure liquid is conveyed from the master cylinder to the interior of wheel cylinder as before, and the pistons 12 and 13 are brought into expansion from each other.

Therefore, shoe upper ends 14a and 15a are brought into expansion towards the brake drum against the action of back spring 36 until they are brought into sliding contact with the brake drum through their friction elements 21 and 22.

In this case, the piston 12, the stopper lever 56 and the upper end 15a of shoe 15 are moved in unison with each other in the right-hand direction for brake application. The recess 58' on lever 56 will act upon the adjusting lever 25' at its upper end 25a' for moving it in the right-hand direction. But, the adjusting lever 25' does not rotate by the spring 54, or alternatively, it may perform a clockwise rotation about its pivot pin 23' only a small degree, but in such a direction that the lever end 30 will more recede from the wheel 31, thus the latter being not driven in any way. With the rightward expansion movement of the shoe 15, lever 25' would be rotated under the action of spring 39'. But, in order to do so, there must be created a relative movement between stringer 26 and shoe 15. Under the influence of spring 39', such mutual movement cannot take place so that the lever 25' cannot be actuated practically.

With the parking lever actuated, cable or wire 63 will be pulled leftwards as before, and the lever 49' is rotated, therefore, in the clockwise direction and about its pivot pin 63, thereby the stringer member 26 being urged to move leftwards against the action of back spring 36. Therefore, the upper end 14a of shoe 14 will be subjected to expanding movement as before.

Reaction force will thus be transmitted from the brake drum, so as to expand the upper shoe end 15a being subjected to rightward expanding movement towards the brake drum until it is brought into braking contact therewith.

In this case, stringer 26 and shoe 15 are allowed to make a mutual movement so that the spring 39' will act upon the adjusting lever 25' to make a counter clockwise pivotal movement around its pivot pin 23' and the wheel 31 will perform a rotational movement against the rotational resistance provided by the back spring 36, so as to perform a gap-correcting action, should the brake gap exceed the prescribed value. In this case, although the upper end 25a' of lever 25 is in engagement with stopper lever 56, piston 12 can be receded in its position inwardly under the action of spring 59.

Under certain circumstances, the stopper or engageable lever 56 may be positioned between the piston 12 and the shoe 15 so as to provide certain idle plays. With the parking lever 49' pulled for actuation, reaction will be transmitted reversedly from the side of braking drum to the stringer 26 so that considerable frictional resistance is created in the threadedly shifting mechanism embodied in the automatic adjuster per se. Therefore, the gap-adjusting can be performed without any introduction of brake drum distortion or deformation, by load-escaping elongation of the spring 39'.

Next assuming the parking brake is actuated in the service brake, both brakes are actuated applied condition, or simultaneously, the stopper or engageable lever 56' are brought into engagement with the upper end 25a' of adjusting lever 25' by actuation of the service brake, and the actuation of the parking brake will cause the stringer 17 to move rightwards. Therefore, a relative separation of the stringer from shoe 15 will cause only to further elongate the spring 39' and a rotation of the adjusting lever 25' becomes difficult to execute. Therefore, in this case, the wheel 31 can not be rotated.

Since the service brake application will invite almost always a thermal and/or mechanical deformation of the drum, an actuation of the brake gap adjuster should not preferably be performed. This desired effect can be automatically realized, so as to exclude the disadvantageous and unintentional introduction of the drum distortion invited by service brake application. Therefore, with use of the automatic brake adjuster according co this invention, the brake gap correction can be performed without any fear of brake drum distortion of the above kind.

If the drum distortion should be introduced in the regular gap-correcting operation of the adjuster, the shoe brake will represent a lesser or larger degree of "-brake slip" by virtue of the maintainance of an incorrectly set brake gap. According to the invention, such defect can be perfectly remedied.

Although the foregoing detailed disclosure of the invention has been directed to such braking system wherein the wheel brake cylinder is fixedly mounted on the backing plate, the invention should not be limited to such specific style of the wheel brake, and the cylinder can be slidably mounted on the backing plate, when occasion may desire it. Also, the invention should not be limited to the specific embodiments of the brake shoes so far shown and described. The novel teaching of the present invention can be applied to other various types of the shoe brake.

Since the design and arrangement of the brake unit according to this invention are highly simple in its structure so that a substantial reduction of the manufacturing cost can be assured, together with a substantial easiness in the production of the apparatuses.

The embodiments of the invention in which an exclusive property or privilege is claimed are as follows:

1. An automatic brake gap adjuster for a powered and wheeled vehicle, comprising in combination of:
   actuator means adapted for expanding a pair of movable brake shoes against a rotatable brake drum by means of an expandable piston and cylinder assembly;
   parking lever means mounted in proximity to said actuator means and comprising at least two link members;
   automatic adjusting means comprising a screw engaging stringer member, a ratchet wheel having outer peripheral teeth, and an adjusting lever adapted for rotating said ratchet wheel, and being mounted on said parking lever means; and
   a further lever means having one end maintained in engagement with said expandable piston for unitary movement therewith and its opposite end engaging said adjusting lever for disabling said automatic adjusting means upon actuation of said actuator means and for allowing said automatic adjusting means to actuate upon actuation of said parking brake lever means.

2. Automatic brake gap adjuster comprising in combination of:
   a backing plate mounted on a stationary of an automotive vehicle;
   a hydraulically operated actuator mounted on said backing plate;
   a pair of hydraulic pistons expandably and contractably mounted in said actuator;
   a brake drum mounted on said backing plate rotatably in unison with a vehicle wheel;
   a stationary anchor fixedly mounted on said backing plate;
   a pair of brake shoes positioned between said actuator and said anchor and adapted for sliding cooperation with said brake drum when said shoes have been expanded;
   back spring means tensioned between said brake shoes;
   a stringer mounted in proximity to said actuator in parallel thereto, said stringer being provided with a rotatable toothed wheel threadedly coupled with said stringer;
   a parking lever pivotably mounted on one of said shoes and in operative engagement with said stringer;
   a further lever mounted pivotably on said parking lever and adapted for operative engagement with said ratchet wheel;
   a stopper lever arranged between said one of brake shoes and said actuator and adapted for engagement with last-mentioned lever upon actuation of said actuator; and
   spring means tensioned between said stringer or a main body and said last-mentioned lever; the adjusting operation for correcting the brake gap between shoe and drum being performed only upon actuation of the parking brake and the adjusting operation being disabled upon actuation of said actuator.

3. Automatic brake gap adjuster as claimed in claim 2, said last-mentioned lever and said stopper lever being kept in operative connection with each other.

4. Automatic brake gap adjuster as claimed in claim 2, wherein a further spring means is tensioned between said stringer and said shoe.

5. Automatic brake gap adjuster as claimed in claim 2, wherein said actuator comprises a cylinder body; at least a piston and spring means.

6. Automatic brake gap adjuster comprising in combination of:
   a backing plate fixedly mounted on a stationary part of an automotive vehicle;
   a hydraulic actuator mounted on said backing plate;
   two hydraulic pistons slidably mounted in said cylinder;
   a stationary anchor fixedly mounted on said backing plate;
   a pair of brake shoes arranged between said anchor and said actuator and adapted for operatively engaging with a brake drum rotatably mounted on said backing plate;
   back spring means tensioned between said brake shoes;
   stringer means positioned in proximity to said actuator in parallel thereto, said stringer means being provided with a ratchet wheel kept in threaded coupling with said stringer;
   a parking lever pivotably mounted on one of said shoes and kept in operative engagement with said stringer;
   a further lever pivotably mounted on said stringer or a main body and adapted for operatingly engaging said ratchet wheel;
   stopper lever positioned between said one of said shoes and said actuator and adapted for engagement with said further lever upon actuation of said actuator;
   transmission lever, one end thereof being mounted on said further lever and the other end of said transmission lever being pivotally mounted on said one of the shoes; and
   spring means tensioned between said further lever and said one of the shoes through said transmission lever, the adjusting operation of the brake gap between said shoes and said drum being performed only upon actuation of the parking brake and said operation being disabled upon actuation of said actuator for service brake application.

7. Automatic brake gap adjuster as claimed in claim 6, wherein said further lever and said transmission lever are kept in operating connection by a detouchable cross-joint.

8. Automatic brake gap adjuster as claimed in claim 6, wherein said further lever and said stopper lever are operatively connected with each other through a detouchable cross-joint.

9. Automatic brake gap adjuster as claimed in claim 6, wherein a still further spring means is tensioned between said stringer and one of said brake shoes.

10. Automatic brake gap adjuster as claimed in claim 6, wherein said hydraulic actuator comprises a cylinder body, at least a hydraulic piston and spring means.

* * * * *